United States Patent

Scheffler-Hudlet et al.

[11] Patent Number: 6,080,695
[45] Date of Patent: Jun. 27, 2000

[54] LOW LIGHT TRANSMISSION NEUTRAL GRAY GLASS

[75] Inventors: Herbert Scheffler-Hudlet; Roberto-Marcos Cabrera-Llanos; José-Guadalupe Cid-Aguilar, all of Estado de México; Rafael-Enrique Pinto-Negroe, Sección, all of Mexico

[73] Assignee: Vidrio Plano De Mexico, S.A. De C.V., Tlannepantla, Mexico

[21] Appl. No.: 08/982,612

[22] Filed: Dec. 2, 1997

[51] Int. Cl.[7] ............... C03C 3/087; C03C 4/02; C03C 4/08; C03C 4/10

[52] U.S. Cl. ............... 501/71; 501/70; 501/904; 501/905

[58] Field of Search ............... 501/70, 71, 904, 501/905, 72

[56] References Cited

U.S. PATENT DOCUMENTS

| | | | |
|---|---|---|---|
| 5,242,869 | 9/1993 | Tarumi et al. | 501/905 |
| 5,318,931 | 6/1994 | Nakaguchi et al. | 501/70 |
| 5,656,560 | 8/1997 | Stotzel et al. | 501/70 |
| 5,837,629 | 11/1998 | Combes et al. | 501/71 |

FOREIGN PATENT DOCUMENTS 2274841  8/1994  United Kingdom.

*Primary Examiner*—Michael Marcheschi
*Attorney, Agent, or Firm*—Abelman, Frayne & Schwab

[57] ABSTRACT

A neutral gray soda-lime-silica glass having a low light transmission (less than 20%), which reduces the transmission of solar energy, such as the transmission of near infrared radiation (less than 14%) and, in a greater degree, the transmission of ultraviolet radiation (less than 12%), comprising the following components in weight percentage:

| | |
|---|---|
| $Fe_2O_3$ | from 1.20 to 2.0% |
| FeO | from 18 to 28% (Reduction Percentage). |
| $Co_3O_4$ | from 0.020 to 0.030% |
| Se | from 0.0025 to 0.010% |
| CuO | from 0.0050 to 0.050% |

This glass avoids the use of the coloring compounds such as the nickel, chromium and manganese.

1 Claim, No Drawings

LOW LIGHT TRANSMISSION NEUTRAL GRAY GLASS

BACKGROUND OF THE INVENTION.

A. Field of the Invention

This invention refers to a composition and to a method for the commercial production of a privacy glass, of neutral gray color, having a light transmission less than 20% and an infrared radiation transmission less than 14% and especially an ultraviolet transmission less than 12% for use in the construction industry and mainly in the automotive industry.

B. Description of the Related Art

Several patents have been developed for obtaining gray glass, for "privacy" purposes, having low light transmission and low infrared and ultraviolet radiation transmission.

The glasses disclosed in almost all the prior patents referring to a type of neutral gray glass for privacy purposes, are based on three basic components: iron oxide, cobalt oxide and selenium, using different proportions and, together with the typical formulation of a soda-lime-silica glass, constitute the basic composition of the glass.

That is the case of the glasses of the U.S. Pat. No. 4,873,206 of James Jones, issued Oct. 10 of 1989, the U.S. Pat. No. 5,393,593 of Gulotta et al, issued Feb. 28 of 1995, and the U.S. Pat. No. 5,278,108 of Cheng et al, issued Jan. 11 of 1994, in which these components are used without any additional component.

Some other glasses disclosed in other patents, such as those mentioned in the following paragraphs use, besides the three mentioned components, different metallic elements conferring the characteristics to the final product, that allow them to be classified as privacy glasses, in order to be used in the construction and automotive industries.

The U.S. Pat. No. 5,308,805 of Baker et al, issued May 4 of 1994, describes a neutral gray glass having a low transmission, in which one of the claimed components is the nickel oxide in proportions of 100 to 500 ppm.

In the past, the heat absorbing gray glasses containing nickel in their structure, frequently presented inclusions of nickel in the form of sulfide which, during the melting of the glass were formed until appearing as small invisible particles which were impossible to distinguish in viewing an already formed glass. These inclusions of nickel sulfide are due to their high coefficient of thermal expansion that can cause thermal stresses sufficient to fracture a glass plate. This is a singular problem when the glass pieces are subjected to a thermal treatment as the tempering, in which the presence of the nickel sulfide cause an excessive percentage of breakdown pieces during or as a consequence of the tempering process.

An additional disadvantage of the glasses containing nickel is the change of color that they undergo after the thermal process, such as for example, after tempering.

U.S. Pat. No. 5,023,210 of Krumwide et al, issued Jun. 11 of 1991, discloses a low transmission neutral gray glass composition that does not includes nickel. In order to achieve similar characteristics to that of a neutral gray glass, Krumwide uses chromium oxide in amounts of 220 to 500 ppm as $Cr_2O_3$, in its composition which, in these proportions, produces a gray tone and adjusts the levels of selenium and cobalt oxide in order to make it a neutral tone. However, in previous references it is mentioned a preference of not using these compounds because of the problems presented by the difficulty of melting the chromium compounds (U.S. Pat. No. 4,837,206), and additionally because these have difficulties in order to discard the solid materials containing said compounds. Also, in the U.S. Pat. No. 5,308,805, there is mentioned the inconvenience of the chromium oxide used like coloring agent, since it requires the use of additional operations and apparatuses to the conventional ones into the melting furnaces in order to reach the necessary conditions to produce the desired glasses.

The U.S. Pat. No. 5,346,867 of Jones et al, issued Sep. 13 of 1994, discloses a heat absorbing glass composition having a neutral gray color, which uses manganese and titanium oxide in order to increase the retention of the selenium (that is a high cost component), during the production process. Although from previous references (U.S. Pat. No. 4,873,206), it was known that the use of the manganese has a tendency to form a yellowish-brown coloration when it is exposed to the ultraviolet radiation making it difficult to maintain the uniformity of the product, and the use of the titanium causes a yellowish coloration when the glass enters in contact with the liquid tin of the float process. This is what makes undesirable these two aspects during the production of the glass because it makes critical the control of color in order to obtain the desired tone during the manufacture. Jones et al mentioned in their patent '867, that the process of solarization is a phenomenon associated with the change of $Fe^{3+}$ to $Fe^{2+}$ which cause an undesirable change in the color, mentioning that they found that this does not occur in the disclosed glass and additionally the use of the titanium oxide is incorporated into the glass in order to obtain the desired range of dominant wave length, as well to reduce the transmission of ultraviolet radiation.

On the other hand, it is well known by the persons skilled in the art, that the addition or substitution of one or more colorants for other colorants, or the change in the relative proportional amount in the glass composition, affects not only the color of the product, as for example the dominant wave length of the color or the excitation purity, but also the luminous transmission, the heat absorption and additional properties such as the transmission of ultraviolet and infrared radiation.

It has been known that copper played an important role in the production of colored glass, ceramics and pigments. It has been recognized, for example, the coloration of the Persian ceramic for their tonality conferred by the copper. Of special interest for ceramic artists are the turquoise blue and especially the Egyptian and Persian blue dark (Woldemar A. Weil; Colored Glasses, Society of Glass Technology, Great Britain, p. 154–167, 1976).

Copper has been used in the glass compositions, not only in those of soda-lime-silica type, but also in others such as those containing, for example, borosilicate. Therefore, the developed color depends on the base of the glass, on its concentration and on its oxidation state.

For the case of the mentioned glass as a base, the copper in the form of the oxide imparts a blue coloration of a greenish tone, specifically turquoise, however, in the glass, the copper can be in its monovalent state, which does not impart color. So, the blue greenish coloration depends not only on the amount of copper present, but on the ionic balance between the cuprous and cupric states. The maximum absorption of the copper oxide is in a band centered at 780 ηm and a maximum weak secondary peak is present at the 450 ηm, which disappears at high soda content (around 40% weight). (C. R. Bamford, Colour Generation and Control in Glass, Glass Science and Technology, Elsevier Scientific Publishing Company, p. 48–50, Amsterdam, 1977).

In the production of red ruby glass, a mixture containing copper oxide together with any reducer agent (SnO is commonly used), is melted in reduced conditions. The initial mixture shows the blue characteristic color of the copper II, but as soon as the melting begins, changes the color to a pale straw yellow which takes place during this stage. Due to a thermal treatment to a temperature between the annealing point and the softening point, the ruby red color is developed. If, during the melt, the reduction state is carried out beyond a critical stage, the color changes to brown and appears opaque or "turned off". On the other hand, if the copper is insufficiently reduced, some traces of blue color are kept and the ruby red color is not developed (Amal Paul, Chemistry of Glasses, Chapman and Hall, p. 264–270, London, 1982).

U.S. Pat. No. 2,922,720 of Parks et al, issued Jun. 20, 1957, discloses the use of the copper in the glass as: " . . . The copper has been used as coloring agent for glass upon developing a coloration ruby red, but in order to obtain the color in a open melt furnace, it has been necessary the use of cyanogens as reducer agent . . . ", additionally mentions the effect of the copper in the coloration of the glass, as due to the colloidal suspension of particles of metallic copper in the glass, and by analogy it is believed that a particle size produces the ruby red colors, depending on the intensity of the color of the copper concentration. For smaller particle sizes, the effect of color is null.

The glass of the present invention, avoids the use of some metals that the above mentioned patent disclose as very important, this is the case of the nickel, the chromium and the manganese.

In the glass of the present invention, the copper oxide (CuO) is used additionally to the use of iron oxide, cobalt oxide and selenium, as an alternative for obtaining of a lightly greenish gray tonality in the region of neutral color frequently used in the automotive and construction industry. Additionally providing a reduction in the ultraviolet radiation transmission and a reduction in the near infrared region for the bands of absorption around the 800 nanometers which help to reduce the infrared solar transmission.

So that, in the present invention, a gray neutral glass having a luminous transmission less than 20%, and preferably between 15 and 18% for a glass thickness between 3.9 and 4.1 mm., and a reduction on the solar energy transmission that is expressed as a transmission of infrared radiation less than 14%, and an ultraviolet radiation transmission less than 12%, is achieved.

SUMMARY OF THE INVENTION

It is therefore a main objective of the present invention, to provide a neutral gray glass composition, by using the copper in form of oxide, as an alternative for the obtention of the typical gray greenish color in the privacy glasses used in the construction industry and, preferably, in the automotive industry.

It is also a main objective of the present invention, to provide a neutral gray glass composition, based on a typical soda-lime-silica glass composition including the compounds of cobalt oxide, iron oxide and selenium, as well as copper oxide, by means of which the use of nickel, chromium and manganese, is avoided.

It is still a main objective of the present invention, to provide a neutral gray glass composition, of the above mentioned nature, by using copper in form of an oxide, that shows an absorption in the near infrared region, but mainly in the ultraviolet region, due to its combination with iron oxide, cobalt oxide and selenium, in order to substitute to the nickel, chromium and manganese in the existent formulations, since these chemical elements show undesirable characteristic on the product or on the process, under certain circumstances.

It is a further main objective of the present invention, to provide a neutral gray glass having a luminous transmission less tan 20% and preferably between 15 and 18% for a glass thickness between 3.9 and 4.1 mm., and a reduction in the solar energy transmission that is shown with an infrared radiation transmission less than 14%, and an ultraviolet radiation transmission of less than 12%. It is additionally a main objective of the present invention, to provide a neutral gray glass having a dominant wave length of 480 to 575 ηm, preferable from 500 to 570 ηm and a color excitation purity less than 10%, preferably less than 8%.

These and other objectives and advantages of the neutral gray privacy glass, of the present invention, will be evident to the experts in the field, from the following detailed description thereof.

DETAILED DESCRIPTION OF THE INVENTION

The typical composition of a soda-lime-silica glass used in the construction and automotive industry, and formed by the so-called glass float process, is characterized by the following formulation based on weight percentage with regard to the total weight of the glass:

| Components | % by weight |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The neutral gray glass composition of the present invention is based on the above disclosed composition, to which the following coloring compounds have been added:

| Components | % by weight |
| --- | --- |
| $Fe_2O_3$ | 1.200 to 2.000 |
| $Co_3O_4$ | 0.020 to 0.030 |
| CuO | 0.005 to 0.050 |
| Se | 0.0025 to 0.010 |
| % of reduction | 18.0 to 28.0 |

It is common in the glass industry to refer the total iron content in the glass composition or in the glass melting mixture, as the total iron expressed as $Fe_2O_3$.

When a lot of glass is melted, part of that amount of total iron is reduced to FeO, while the rest is maintained as $Fe_2O_3$. The balance between the ferric and ferrous oxidation states in the melted mixture are the result of an equilibrium of the final oxidation reduction state, which is a mixture between the use of oxidation or reducing agents in the feed mixture and to the combustion characteristics, for example, the air-gas relationship used in the furnace in order to melt the mixture. The reduction of $Fe_2O_3$ produces not only FeO, but also oxygen, decreasing the combined weight of the two compounds of iron in the resulting glass.

Consequently, the combined weight of the FeO and $Fe_2O_3$ contained in the resulting glass composition, will be minor, less than that fed during the mixture, and less than the total of the initial iron used expressed as $Fe_2O_3$. For this reason, it is understood that the total iron is the iron expressed in the form of $Fe_2O_3$, as it is used herein, as meaning the amount of iron fed in the mixture before its reduction. And it is to be understood that the reduction value of the ferrous state is defined as the weight of the ferrous oxide (FeO) expressed as $Fe_2O_3$ in the glass product, divided by the weight percentage of total iron expressed as $Fe_2O_3$. This amount in the glass industry is commonly expressed in the form of reduction percentage.

The physical properties such as the light transmission correspond to calculated variables based on internationally accepted standards. So that the light transmission is evaluated using the illuminant "A" and standard Observer of 2°, also known as of 1931 [C.I.E Publication. 15.2, ASTM E-308 (1990)]. The wave length range used for these purposes is of 380 to 780 ηm, integrating values in numeric form with intervals of 10 ηm. The solar energy transmission represents the heat which the glass achieves in direct form, evaluating it from 300 up to 2150 ηm with intervals of 50 ηm, the numeric form of calculation uses as recognized standard values those reported by Parry Moon in "Proposed Standard Solar Radiation Curves for Engineer Use", Franklin Institute, Vol. 230, p. 604, table II, 1940.

The calculation of the ultraviolet radiation transmission (UV), involves only the participation of the solar UV radiation, so that it is evaluated in the range of 300 to 400 ηm of wave length using intervals of 10 ηm. For the infrared radiation transmission (IR), it is only contemplated, as well as the UV radiation, the range wherein the solar spectrum has influence, so that the range of the near Infrared region from 800 to 2150 ηm, with intervals of 50 ηm, is used. Both calculations use the solar radiation values of Parry Moon above mentioned.

The amount of solar heat which is transmitted through the glass also can be calculated by the contribution of thermal energy with which participates each one of the regions wherein the solar spectrum has influence, which is from the ultraviolet region (280 ηm), to the near infrared region (2150 ηm), which is of 3% for UV, 44% for the visible and of 53% in order for the IR, however, the values of the direct solar energy transmission, in the present invention, are calculated on the basis of a numeric integration taking into account the whole range of the solar spectrum of 300 to 2150 ηm, with intervals of 50 ηm and using the values of solar radiation reported by P. Moon.

The specifications for the determination of color such as the dominant wave length and the purity of excitement have been derived from the Tristimulus values (X, Y, Z) which have been adopted by the International Commission of Illumination (C.I.E.), as a direct result of experiments involving many observers. These specifications could be determined by the calculation of the three-chromatic coefficients x,y,z of the Tristimulus values that corresponding to the red, green and blue colors, respectively. The three-chromatic values are graphicated in the chromaticity diagram and compared with the coordinates of the illuminant "C" considered as illumination standard. The comparison provides the information in order to determine the color purity excitement and its dominant wave length. The dominant wave length defines the wave length of the color and its value is located in the visible range, of the 380 to 780 ηm, while for the purity of excitement, the less the value is, the nearest tends to be a neutral color. A deeper understanding of these topics can be obtained form the "Handbook of Colorimetry" published by the "Massachussets Institute of Technology", of Arthur C. Hardy, issued in 1936.

We claim:

1. A neutral gray soda-lime silica glass, wherein the colorant component consists essentially of, in weight percentage:

| | |
|---|---|
| $Fe_2O_3$ | from 1.20 to 2.0% |
| FeO | from 18 to 28%, as reduction percentage; |
| $Co_3O_4$ | from 0.020 to 0.030%; |
| Selenium | from 0.0025 to 0.010%; and |
| CuO | from 0.0050 to 0.050%; | the glass having a light transmission of less than 20%, a near infrared transmission, less than 14%, an ultraviolet radiation transmission less than 12%, a dominant wave length of 480 to 575 ηm and a purity of color excitement less than 10%.

* * * * *